United States Patent Office 2,882,277
Patented Apr. 14, 1959

2,882,277
ASYMMETRICAL INDIGOID DYESTUFFS

Jakob Mueller, Muenchenstein, near Basel, Switzerland, assignor to Ciba Limited, Basel, Switzerland, a Swiss firm No Drawing. Application January 8, 1957
Serial No. 632,965

Claims priority, application Switzerland January 25, 1956

4 Claims. (Cl. 260—332)

This invention provides new asymmetrical indigoid dyestuffs of the formula

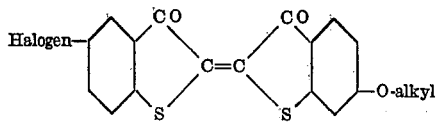

in which the alkyl group contains at least two carbon atoms, and preferably not more than 4 carbon atoms.

The invention also provides a process for the manufacture of the aforesaid new dyestuffs, wherein a 5-halogen-3-hydroxythionaphthene of the formula

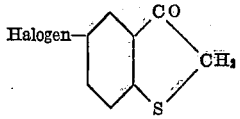

or a derivative thereof containing a reactive substituent in the 2-position is condensed with a 6-alkoxy-3-hydroxythionaphthene of the formula

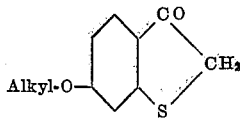

in which the alkyl group contains at least two and preferably not more than four carbon atoms, or a derivative thereof containing a reactive substituent in the 2-position.

As a 5-halogen-3-hydroxythionaphthene there is used for example 5-bromo-3-hydroxythionaphthene but more especially 5-chloro-3-hydroxythionaphthene. The latter compound can be obtained in known manner by the xanthate process from 1-amino-4-chlorobenzene by way of the corresponding thioglycollic acid. Ring closure of the thioglycollic acid to form the hydroxythionaphthene can be carried out with the use of phosphorus trichloride in order to prepare the acid chloride followed by treatment with aluminum chloride. Alternatively, the ring closure can be carried out in the desired manner by using chlorosulfonic acid as condensing agent, and especially at a temperature below 0° C. whereby the formation of the corresponding symmetrical dyestuff is substantially avoided.

The 6-alkoxy-3-hydroxynaphthenes also used as starting materials, can be obtained, for example, from the appropriate 1-amino-4-alkoxybenzenes by the so-called sulfur monochloride method. Good dyestuffs are obtained with 6-propyloxy-3-hydroxythionaphthene, but especially with 6-ethoxy-3-hydroxythionaphthene.

As derivatives of the aforesaid 3-hydroxythionaphthenes containing in the 2-position a reactive substituent there come into consideration more especially their 2-anils. The latter can be obtained in known manner from the 3-hydroxythionaphthenes of the above formulae in known manner by reaction with nitroso-benzenes, for example, paranitroso-dimethylaniline.

The condensation can be carried in known manner by bringing together the components in an inert solvent, such as benzene or a chlorinated hydrocarbon, especially monochlorobenzene, for example, at a slightly raised temperature. As is known care should be taken that the components are in different states of oxidation, for example, one of them being in the form of the hydroxythionaphthene and the other, for example, in the form of its anil.

The dyestuffs of this invention, and especially the dyestuff of the formula

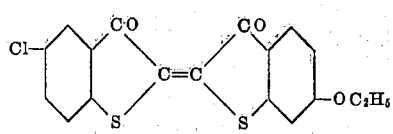

can be used in known manner for dyeing a very wide variety of materials, such as wool, silk, superpolyamide fibers, cellulose acetate artificial silk, and especially fibers of vegetable character, such as cotton, linen and staple fibers of regenerated cellulose. They are especially suitable for printing by the customary methods, for example, the so-called potash printing method. There are obtained clear red tints having very good properties of fastness.

Compared with the isomeric dyestuff described in German Patent No. 627,903, the dyestuffs obtained according to the process of the invention, are characterized by dyeing cotton and viscose artificial silk in level tones and by producing dyeings with better fastness to washing properties.

The following examples illustrate the invention, the parts and percentages being by weight:

Example 1

18.5 parts of 5-chloro-3-hydroxythionaphthene are dissolved in 500 parts of chlorobenzene, and condensed with 32.6 parts of the 2-(para-dimethylamino)-anil of 6-ethoxy-3-hydroxythionaphthene for a few hours at 80–90° C. The dyestuff, which separates in good yield, is filtered off, washed with chlorobenzene and alcohol and dried. It is a scarlet red powder which exhibits a green coloration in concentrated sulfuric acid. When printed on cotton by the usual potash printing process this dyestuff yields clear red tints having very good properties of fastness.

The same dyestuff is obtained by condensing 6-ethoxy-3-hydroxythionaphthene with the 2-(paradimethylamino)-anil of 5-chloro-3-hydroxythionaphthene. On using the corrseponding amount of 5-bromo-3-hydroxythionaphthene instead of the 5-chloro-3-hydroxythionaphthene there is obtained a dyestuff which yields similar prints.

Example 2

31.6 parts of 2-(p-dimethylamino)-anil of 5-chloro-3-hydroxythionaphthene are added to a solution of 20.8 parts of 5-propyloxy-3-hydroxythionaphthene in 500 parts of chlorobenzene and condensed for some hours at 80–90° C.

The dyestuff of the formula

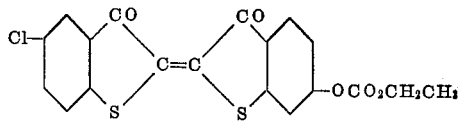

is filtered and worked up in the customary manner. A red powder is obtained which exhibits a dark violet colour in concentrated sulfuric acid.

When printed on cotton by the usual printing process this dyestuff yields scarlet red tints having very good washing and chlorine fastness properties.

The tint is somewhat darker than that of the corresponding ethoxy compound of Example 1.

The 6-propyloxy-3-hydroxythionaphthene can be obtained according to the known sulfur monochloride process described, for example, in Venkataraman, "The Chemistry of Synthetic Dyes," vol. 2, page 1027.

4-propyloxy-1-aminobenzene hydrochloride is subjected to the action of sulfur monochloride. The 6-propylhydroxybenzene-1,3-thiaza-2-thionium chloride formed is hydrolyzed to 1-amino-4-propyloxy-6-mercaptobenzene. The latter is reacted with chloracetic acid to 1-amino-4-propyloxy-phenyl-6-thioglycollic acid, the latter is converted into 1-cyano-4-propyloxy-phenyl-6-thioglycollic acid, the latter is hydrolyzed and cyclicized to 6-propyloxy-3-hydroxythionaphthene which forms white crystals melting at 64–66° C. when recrystallized from methanol.

Example 3

30 parts of the dyestuff obtained as described in Example 1 are wetted with 20 parts of alcohol and 120 parts of water then mixed with 700 parts of potassium carbonate thickening, 30 parts of sodium hydroxide solution of 36° Bé, 20 parts of concentrated hydrosulfite powder and the whole is heated to 50–60° C. After cooling the mixture, 80 parts of sodium formaldehyde sulfoxylate are added and the mixture is ground on a wet colour mill. After printing and drying the material it is steamed for 8 hours in a Mather-Platt apparatus free from air rinsed in cold water, then oxidised at 40° C., rinsed with a solution containing 3 parts of perborate and 2 parts of acetic acid of 40% strength per liter, and soaped for 10 minutes at 89–90° C. Finally the material is again rinsed well.

The potassium carbonate thickening is prepared as follows:

70 parts of wheat starch are well stirred with a mixture of 100 parts of water and 100 parts of glycerine, and then 170 parts of tragacanth thickening (60:1000), and 140 parts of British gum are added. The whole is boiled for ½ hour and cooled while stirring. There are then added 170 parts of potassium carbonate dissolved in 250 parts of water, and the whole is boiled for a short time and then cooled.

What I claim is:
1. Asymmetrical indigoid vat dyestuffs of the formula

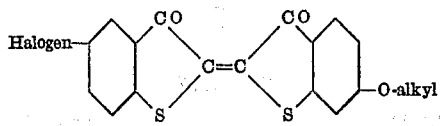

in which the alkyl radical has at least 2 C-atoms.

2. Asymmetrical indigoid vat dyestuffs of the formula

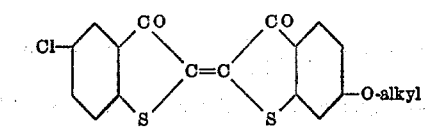

in which the alkyl radical has 2 to 4 C-atoms.

3. The dyestuff of the formula

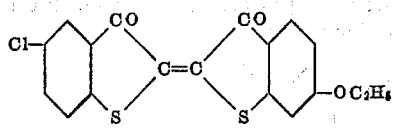

4. The dyestuff of the formula

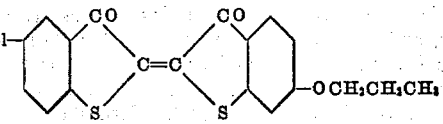

References Cited in the file of this patent

UNITED STATES PATENTS

| | | |
|---|---|---|
| 2,007,094 | Muller et al. | July 2, 1935 |

FOREIGN PATENTS

| | | |
|---|---|---|
| 627,903 | Germany | Mar. 30, 1936 |
| 165,051 | Switzerland | Jan. 16, 1934 |

OTHER REFERENCES

Dalyleish et al.: Journal of the Chemical Society (London), 1945, pp. 893–909.

UNITED STATES PATENT OFFICE

CERTIFICATE OF CORRECTION

Patent No. 2,882,277                                                         April 14, 1959

Jakob Mueller

It is hereby certified that error appears in the printed specification of the above numbered patent requiring correction and that the said Letters Patent should read as corrected below.

Column 2, line 49, for "corrseponding" read -- corresponding --; line 64, Example 2, right-hand end moiety of the formula, for "-$OCO_2CH_2CH_3$" read -- -$OCH_2CH_2CH_3$ --.

Signed and sealed this 20th day of October 1959.

(SEAL)

Attest:

KARL H. AXLINE                                                        ROBERT C. WATSON

Attesting Officer                                                Commissioner of Patents